United States Patent
Ronnekleiv et al.

(10) Patent No.: US 10,001,362 B2
(45) Date of Patent: Jun. 19, 2018

(54) PROCESSING DATA FROM A DISTRIBUTED FIBRE-OPTIC INTERFEROMETRIC SENSOR SYSTEM

(71) Applicant: Optoplan AS, Tiller (NO)

(72) Inventors: Erlend Ronnekleiv, Trondheim (NO); Ole Henrik Waagaard, Trondheim (NO)

(73) Assignee: OptoPlan AS, Trondheim (NO)

( * ) Notice: Subject to any disclaimer, the term of this patent is extended or adjusted under 35 U.S.C. 154(b) by 729 days.

(21) Appl. No.: 14/510,537

(22) Filed: Oct. 9, 2014

(65) Prior Publication Data
US 2015/0100279 A1    Apr. 9, 2015

(30) Foreign Application Priority Data

Oct. 9, 2013 (EP) .................................... 13187914

(51) Int. Cl.
| | | |
|---|---|---|
| *G01B 9/02* | (2006.01) | |
| *G01V 1/18* | (2006.01) | |
| *G01D 5/353* | (2006.01) | |
| *G01H 9/00* | (2006.01) | |

(52) U.S. Cl.
CPC ....... *G01B 9/02075* (2013.01); *G01B 9/0207* (2013.01); *G01D 5/3539* (2013.01); *G01D 5/35335* (2013.01); *G01D 5/35387* (2013.01); *G01H 9/004* (2013.01); *G01V 1/186* (2013.01); *G01B 9/02056* (2013.01)

(58) Field of Classification Search
CPC .................................................. G01B 9/02056
See application file for complete search history.

(56) References Cited

U.S. PATENT DOCUMENTS

| | | |
|---|---|---|
| 4,825,424 A | 4/1989 | Lamb et al. |
| 5,227,857 A | 7/1993 | Kersey |
| 7,245,382 B2 | 7/2007 | Ronnekleiv |
| 8,023,829 B2 | 9/2011 | Nash et al. |
| 2003/0142319 A1 | 7/2003 | Ronnekleiv et al. |
| 2005/0078316 A1 | 4/2005 | Ronnekleiv et al. |

(Continued)

FOREIGN PATENT DOCUMENTS

GB        2 284 256        5/1995

*Primary Examiner* — John Kuan
(74) *Attorney, Agent, or Firm* — Tong, Rea, Bentley & Kim, LLC

(57) ABSTRACT

A method of processing data from a distributed fibre-optic interferometric sensor system for measuring a measurand, the system comprising multiple interferometric sensors. The method comprises interrogating two or more of the multiple interferometric sensors to record a raw measurement time series for each of the sensors. The method further comprises calculating a common reference time series as a measure of central tendency of the raw measurement time series from two or more reference sensors, the reference sensors being selected from the multiple interferometric sensors. Finally, the method comprises compensating at least one raw measurement time series from a measurement sensor selected from the multiple interferometric sensors with the common reference time series to produce a compensated measurement time series, the measurement sensor being configured to be sensitive to the measurand. The invention further relates to a distributed fibre-optic interferometric sensor system.

16 Claims, 6 Drawing Sheets

(56) References Cited

U.S. PATENT DOCUMENTS

| | | | | |
|---|---|---|---|---|
| 2012/0035854 A1* | 2/2012 | Kragh | ................... | G01H 9/004 702/17 |
| 2012/0278043 A1* | 11/2012 | Lewis | ...................... | G01D 1/00 702/189 |
| 2015/0131103 A1* | 5/2015 | Goldner | ................ | G01D 18/00 356/478 |

* cited by examiner

PROCESSING DATA FROM A DISTRIBUTED FIBRE-OPTIC INTERFEROMETRIC SENSOR SYSTEM

PRIOR APPLICATION DATA

The present application claims benefit from European Patent Application 13187914.0 filed on Oct. 9, 2013, incorporated by reference herein in its entirety.

FIELD OF THE INVENTION

The present invention relates to acquisition of data from a distributed fibre-optic interferometric sensor systems. In particular, the invention relates to a method of processing data from such systems.

BACKGROUND OF THE INVENTION

Seismic sensor systems commonly comprise large arrays of fibre-optic interferometric sensors, such as hydrophones and optionally accelerometers.

From U.S. Pat. No. 7,245,382 it is known that fibre-optic interferometric sensors which are co-located with a reference device such that optical parameters extracted from the reference signal may be used to correct parameters extracted from a sensor signal. In that way, fluctuations in interrogating laser frequency and fluctuations in delay of compensating interferometers (where such are used), may be compensated.

Sensitivity of the reference sensors to environmental parameters may lead to cross-sensitivity to the environmental parameters of the reference corrected sensor signals. However, it is challenging and expensive to completely isolate the reference sensors from fluctuations in environmental parameters such as pressure, acceleration, temperature.

Hence, an improved fibre-optic interferometric sensor system would be advantageous, and in particular a more efficient and/or reliable method of compensating measured signals for noise and/or cross-sensitivity would be advantageous.

SUMMARY OF THE INVENTION

An objective of an embodiment of the present invention is to reduce noise in the distributed fibre-optic interferometric sensor system, such as interferometric and receiver noise, and crosstalk/cross-sensitivity of a fibre optic interferometric sensor system having reference interferometers, e.g. a seismic sensor system for use underwater.

A further objective following this is to reduce the required optical power to obtain a certain sensor resolution.

A further objective is to reduce the requirement for desensitation/isolation of the reference interferometers.

It is a further object of the present invention to provide an alternative to the prior art.

In particular, it may be seen as an object of an embodiment of the present invention to provide a method of processing data for a distributed fibre-optic interferometric sensor system that improves the above mentioned problems of the prior art with suppressing noise in measured signals.

The inventors have realized that any noise contributions which are not correlated between the respective sensor and reference device are not compensated, but rather typically doubled in power when a reference signal is subtracted from the sensor signal.

Thus, the above-described object and several other objects are intended to be obtained in a first aspect of an embodiment of the invention by providing a method of processing data from a distributed fibre-optic interferometric sensor system for measuring a measurand, the system comprising multiple interferometric sensors. The method comprises interrogating two or more of the multiple interferometric sensors to record a raw measurement time series for each of the sensors. The method further comprises calculating a common reference time series as a measure of central tendency of the raw measurement time series from two or more reference sensors, the reference sensors being selected from the multiple interferometric sensors. Finally, the method comprises compensating at least one raw measurement time series from a measurement sensor selected from the multiple interferometric sensors with the common reference time series to produce a compensated measurement time series, the measurement sensor being configured to be sensitive to the measurand. In this way, raw measurements from a sensor in the distributed fibre-optic interferometric sensor system may be compensated or referenced with the common reference signal so as to remove common system phase noise originating from an interrogating instrument, e.g. interrogating laser frequency fluctuations and delay fluctuations in compensating interferometers in systems where such are used. By calculating the common reference time series as a measure of central tendency of two or more reference time series, interrogation noise and signal pickup from the measurand and other fluctuations in the sensor surroundings that is not correlated between the reference time series are suppressed from the common reference, compared to directly using a single raw measurement time series as a reference. It is noted that the reference sensors may also be made sensitive to the measurand such that a single interferometric sensor may act both as a reference sensor and a measurement sensor.

In one embodiment of the method, all of the multiple interferometric sensors are selected as reference sensors.

In one embodiment of the method, about 10-50 out of 100 or more sensors are selected as reference sensors.

In one aspect of the invention, the reference sensors are selected from the multiple interferometric sensors after installation of the sensor system, the method comprising selecting as references sensors that experience low acoustic signals or environmental noise pickup.

In one embodiment of the invention, selection of reference sensors from the multiple interferometric sensors is performed according to a scheme. The scheme may e.g. be defined to be periodical, aperiodical, or in response to environmental changes.

In another embodiment a large portion of the sensors are selected as reference sensors, with exceptions for sensors groups that experience highly correlated acoustic signals or environmental noise pickup, and/or sensors that experience acoustic signals or environmental noise pickup well above the average.

In another embodiment where the sensor network comprises different types of sensors, such as both hydrophones and accelerometers, only one type of sensors are selected as reference sensors.

In still another embodiment different types of sensor are selected for different reference sensor groups to generate different common reference signals that are filtered in the frequency domain to compensate for measurement sensor noise in different frequency bands.

In one embodiment of the method, about 10%-90% of the multiple interferometric sensors are selected as reference sensors, such as about 20%-80%, or even about 30%-70%.

In one embodiment of the method, substantially all of the multiple interferometric sensors are selected as measurement sensors.

Thus, from the embodiments described above, it is clear that selection of the reference sensors from the multiple interferometric sensors may be performed in various ways, depending on the result to be achieved. For instance, selection may be performed at the time of assembly of the interferometric sensor system, i.e. if dedicated reference sensors are included in the sensor system. However, selection may also be performed after installation or even in connection with or during a seismic surveying operation. Thus, the skilled person will understand that the act of selecting the reference sensors and measurement sensors, respectively, is to be understood in a broad sense without deviating from the scope of the invention.

In an embodiment of the method according to the invention, the two or more reference sensors span a spatial reference extent, and the reference extent is larger than a characteristic coherence length of the measurand and noise fluctuations in sensor surroundings to which the reference sensors are sensitive. In this way, crosstalk from the measurand onto the common reference may be reduced in that only some, but not all, reference sensors are subject to the same measurand fluctuation at a given time. As a consequence, the common need for isolating or desensitising reference sensors may be alleviated or even lifted in certain embodiments.

In the context of this document, a characteristic coherence length of the measurand is to be understood as the length distance between two points that causes a cross-correlation between the measurand signals at the two points with equal delays to be reduced to one half of the measurands autocorrelation.

In an embodiment of the method according to the invention, one or more of the reference sensors is/are configured to have a reduced sensitivity to the measurand, compared to the sensitivity to the measurand of the measurement sensor interferometers. In this way, cross-talk of the reference interferometers with regards to the measurand may be reduced. Thus, requirements on the spatial distribution of the reference interferometers may be relaxed.

In an embodiment of the method according to the invention, one or more of the interferometric sensors are or comprise fibre Bragg gratings.

In an embodiment of the method according to the invention, one or more of the interferometric sensors are or comprise a Fabry-Perot interferometer.

In an embodiment of the method according to the invention, one or more of the interferometric sensors are or comprise interference between multiple Rayleigh reflections.

In an embodiment of the method according to the invention, one or more of the interferometric sensors are or comprise a Michelson interferometer.

In an embodiment of the method according to the invention, one or more of the interferometric sensors are or comprise a Mach-Zehnder interferometer.

In an embodiment of the method according to the invention, one or more of the interferometric sensors are or comprise a recirculating ring resonator.

In an embodiment of the method according to the invention, the measurement of central tendency is an arithmetic mean. In this way, a particularly simple data processing is obtained.

In an embodiment of the method according to the invention, the measurement of central tendency is a weighted mean.

In an embodiment of the method according to the invention, the weight associated with a raw measurement time series is calculated to be inversely proportional to a root-mean-square RMS amplitude of the series. In this way, a method may be achieved which is robust to outliers, c.f. the use of an arithmetic mean. Robustness to outliers, e.g. as obtainable in this embodiment is effective in suppressing crosstalk from signals that are much larger at some reference sensor locations than other, for instance pickup from a seismic source located close to one or a few reference sensors. The RMS average may be calculated as the square root of a time-moving average of the squared signal.

In an embodiment of the method according to the invention, the measurement of central tendency is a median. In this way, a particularly robust method may be realized, with respect to suppression of outliers.

In an embodiment of the method according to the invention, the measurement of central tendency is a truncated mean.

In an embodiment of the method according to the invention, the distributed fibre-optic interferometric sensor system is or comprises a distributed acoustic sensor system (DAS).

In an embodiment of the method according to the invention, the distributed fibre-optic interferometric sensor system is or comprises a seismic sensor system and the multiple interferometric sensors comprise a fibre-optic hydrophone and/or a fibre-optic accelerometer.

In an embodiment of the method according to the invention, the seismic sensor system is or comprises an ocean bottom seismic sensor system.

In an embodiment of the method according to the invention, the seismic sensor system is or comprises a streamer cable.

In an embodiment of the method according to the invention, the distributed interferometric sensor system further comprises a compensating interferometer (CIF) adapted for introducing a CIF delay between optical pulses propagating the two paths of the CIF. The multiple interferometric sensors are each adapted for introducing a sensor delay, such that a total delay imbalance for each sensor is defined as the CIF delay minus the sensor delay of that sensor. The method according to this embodiment further comprises providing values of the total delay imbalance for each of the multiple interferometric sensors. Then, a CIF noise is estimated as a measurement of central tendency of the raw measurement time series for the reference sensors. A laser frequency noise is estimated for at least one reference sensor as a measurement of central tendency (of the raw measurement time series from each of the at least one reference sensor minus the estimated CIF noise) divided by (the total sensor imbalance of the same of the at least one reference sensor times $2\pi$). For each measurement sensor a laser frequency induced phase noise is estimated as the product of the laser frequency noise and the total delay imbalance times $2\pi$. Finally, the CIF noise and the laser frequency induced phase noise are subtracted from the measurement sensor raw measurement time series to produce the compensated measurement time series. In this way, noise contributions from the CIF may be estimated independently from noise contributions arising from fluctuations in the laser frequency. In a case where the total delay imbalance is the same for all sensors they will all have the same noise contribution from laser frequency noise, and this noise will therefore be indistinguishable from CIF noise. In this case the measure of central tendency will identify the sum of the CIF-induced and the laser frequency-induced noise and subtract both from the demodulated signal. Thus, a particularly simple correction may be used in this case.

In a case where the total delay imbalance is zero for all measurement sensors, the measured signal is not influenced by laser frequency noise.

In an embodiment of the method according to the invention, the multiple interferometric sensors are sensitive to one or more common noise sources and each interferometric sensor has a sensitivity to a common noise source signal of a common noise source. According to the embodiment, the method further comprises for each common noise source, providing values of the sensitivity of each of the multiple sensors to the common noise source. The noise source signals are estimated from the raw measurement time series of the reference sensors and the provided sensitivities of each reference sensor to each noise source signal. Calculating for each measurement sensor the compensated measurement time series by subtracting the sum of all estimated noise source signals multiplied by the sensitivity of the measurement sensor to the respective noise sources.

In an embodiment of the method according to the invention, estimating the noise source signals comprises finding a least squares solution to an over-determined set of linear equations.

In an embodiment of the method according to the invention, the distributed interferometric sensor system further comprises a compensating interferometer, CIF, introducing a CIF delay between optical pulses propagating the two paths of the CIF, wherein one of the one or more noise sources comprises CIF delay fluctuations, the method comprising estimating the noise source signal related to CIF delay fluctuations based on the prerequisite that the sensor sensitivities to CIF delay fluctuations are substantially equal for all sensors.

In an embodiment of the method according to the invention, the multiple interferometric sensors each have a sensor delay, such that a total delay imbalance for each sensor is defined as the CIF delay minus the sensor delay, and one noise source signal comprises laser frequency fluctuations, the method comprising estimating the noise source signal relating to laser frequency fluctuations on the prerequisite that the sensitivity of a sensor to laser frequency fluctuations is proportional to the total delay imbalance of the sensor.

In an embodiment of the method according to the invention, one noise source signal comprises optical source intensity fluctuations, the method comprising estimating the noise source signal relating to source signal fluctuations on the prerequisite that the sensitivity of a sensor to source intensity fluctuations is caused by nonlinear intensity to phase conversion in transmission fibres.

In an embodiment of the method according to the invention, the provided values of the sensitivity of each of the multiple sensors to a noise source is measured through probing, by applying a known modulation of the noise source and measuring the modulation response at the sensor signal. Probing the sensitivities may in one embodiment of the invention be performed after deployment of the sensor system as an initializing step.

In an embodiment of the method according to the invention, the provided values of the sensitivity of each of the multiple sensors to total delay imbalance fluctuations are measured by probing, the method comprising applying a known frequency modulation to a laser probe signal, the laser probe signal having a known amplitude. In this way, the delay imbalance may be determined.

In an embodiment of the method according to the invention, the provided values of the sensitivity of each of the multiple sensors to optical source intensity fluctuations is measured by probing, the method comprising applying an intensity modulation to an optical probe signal, the probe signal having a probe wavelength being at or spectrally near an operating wavelength of one or more of the multiple sensors, the method further comprising measuring phase modulation in response to the nonlinear intensity to phase conversion in the transmission fibres. In this way, the probe signal is made to spectrally match optical pulses used to interrogate the interferometric sensors, and thus experience the same or comparable nonlinear effects to allow for compensating the raw measurement time series for these effects.

Alternatively, probing may be performed at intervals during normal operation.

Alternatively, probing may be performed when drift has been observed.

Furthermore, the above-described object and several other objects are intended to be obtained in a second aspect of the invention by providing a distributed fibre optic interferometric sensor system. The system comprises a fibre optic interferometric sensor array comprising at least a first sensor group of multiple optic interferometric transducers. The transducers are configured for changing an optical property in response to a change of a measurand. The system further comprises an interrogation system, wherein the interrogating system comprises an interrogation light transmitter and a detector. The interrogating system further comprises a signal processor configured for interrogating the fibre optic interferometric sensor phase using the inventive method according to any one of the abovementioned embodiments.

The first and second aspect of the present invention may be combined with each other and any of the other aspects. These and other aspects of the invention will be apparent from and elucidated with reference to the embodiments described hereinafter.

BRIEF DESCRIPTION OF THE FIGURES

The method of processing data and the distributed fibre-optic interferometric sensor system according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
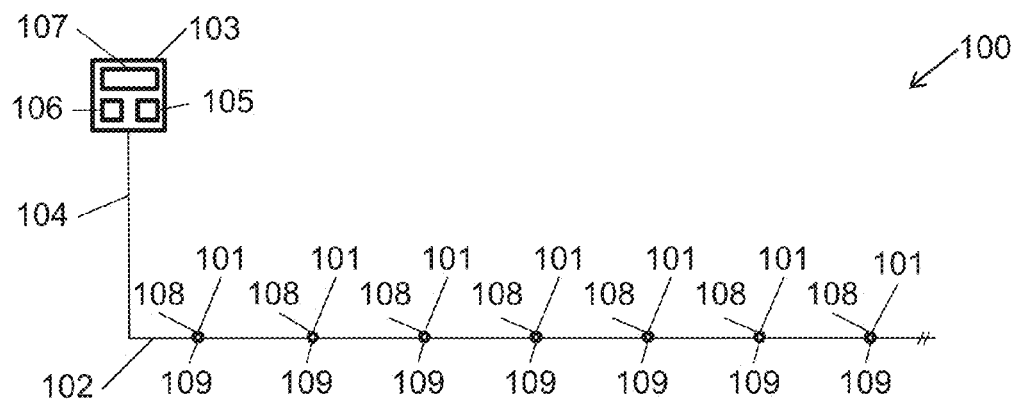
FIG. 1 schematically shows a distributed fibre-optic interferometric sensor system.

FIG. 1 schematically shows a distributed fibre-optic interferometric sensor system 100 according to aspects of the invention. The sensor system 100 comprises multiple interferometric sensors 101, which are distributed along a fibre-optic cable 102. Shown here is a linear array, but the sensors 101 may also be deployed in other topologies, such as a 2D array comprising multiple fibre-optic cables 102. The fibre-optic cable 102 is connected to an interrogation system 103 by a down-lead cable 104. The interrogation system 103 comprises a transmitter 105 for generating an optical signal for interrogating the interferometric sensors 101 and a detector 106 for receiving the optical signal returned from the sensors 101. Furthermore, the interrogation system 103 comprises a signal processor 107 configured for processing the received signal from the sensors into raw measurement time series for each sensor 101. The signal processor 107 is further configured for processing a number of raw measurement time series into a common reference time series, by use of the inventive method, which will be described below. A number of the multiple interferometric sensors 101 are selected as reference sensors 108—here illustrated as being all the interferometric sensors 101. However, in other cases, a subset of the multiple sensors 101 is used as reference sensors 108. The multiple interferometric sensors 101 may be implemented in a number of ways, as e.g. fibre-based Fabry-Perot interferometers (for instance using Fibre Bragg Gratings (FBGs) as reflectors), Michelson interferometers, Mach-Zehnder interferometers, recirculating fibre ring resonators, etc. One or more of the multiple interferometric sensors 101 (so-called measurement sensors 109) are made sensitive to a measurand, so as to give an optical phase-response when being subject to a change in the measurand. Examples of measurement sensors 109 are fibre-optic accelerometers and fibre-optic hydrophones, as known in the art of subsea seismic surveying. The signal processor 107 may subsequently quantify the change in optical phase as induced within a measurement sensor 109 as a corresponding change in the measurand. In the embodiment illustrated here, all the multiple interferometric sensors 101 are selected as both measurement sensors 109 and reference sensors 108, as mentioned above. In systems using dedicated reference sensors 108, these interferometric reference sensors may be by implemented as the same or a different type of interferometer than/as the measurement sensors 109. For instance, the measurement sensors 109 may be implemented as FBG-based Fabry-Perot interferometers wherein different sensors and/or sensor stations (comprising multiple sensors) operating at different wavelengths, while the two or more reference sensors are broadband, i.e. configured to operate at the different wavelengths. Broadband reference sensors may e.g. be implemented using multi-wavelength FBGs, inline broadband reflectors, or recirculating fibre ring resonators.

Figure 2:
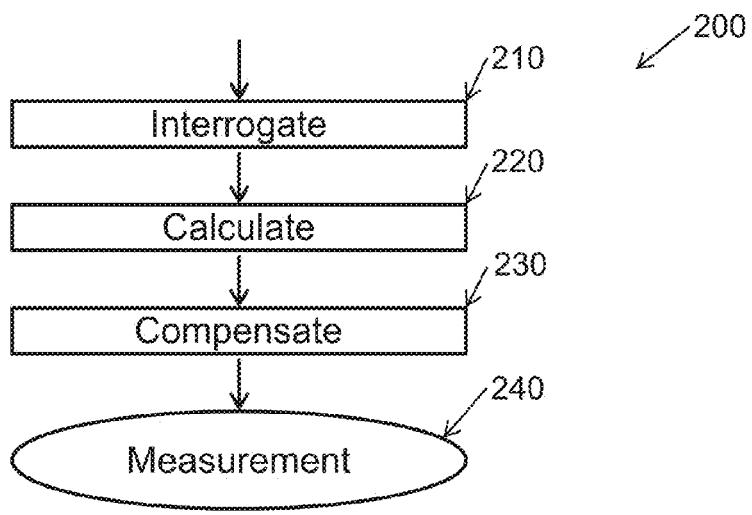
FIG. 2 is a flow-chart of a method according to the invention.

FIG. 2 is a flow-chart that illustrates the method 200 of processing data from a distributed fibre-optic interferometric sensor system, according to aspects of the invention. The multiple interferometric sensors 101 are interrogated 210 via the interrogation system 103, resulting in a raw measurement time series for each of the multiple interferometric sensors 101. At least two of the sensors 101 are selected as reference sensors 108, based on one or more of a number of the abovementioned selection criteria, such as insensitivity to the measurand (relative to the sensitivity of the measurement sensors 109), low noise pick-up from sensor surroundings, or geometrical coverage of a sensor system extent. The raw measurement time series from the two or more reference sensors 108 are then used to calculate 220 a common reference time series. The common reference time series is calculated as a measure of central tendency of the two or more reference raw measurement time series. For instance, the common reference time series may be calculated as a weighted mean, wherein the weight associated with the raw measurement time series from one reference sensor 108 is chosen to be inversely proportional to a mean square of that raw measurement time series. In this way, influence of reference signals with large fluctuations onto the common reference series is suppressed.

Alternatively, the weighted mean may be used with time varying weighing functions.

EXAMPLE 1

Weighted Mean With Time Varying Weighing Functions

In this example suitable for a sub-sea seismic sensor system, the method is implemented using these steps for each seismic shot:
1. Subtract a linear bias trend from each raw measurement time series of the reference sensors ("reference trace"), defined as a straight line from the first to the last data point recorded for the current seismic shot.
2. Calculate a square envelope trace for each reference trace, i.e. corresponding to each reference sensor:
    a. Apply a bandpass filter with low frequency cut-off and high frequency to the reference trace.
    b. Square the filtered reference trace.
    c. Convolve the squared trace with a suitable impulse response to obtain the square envelope.
3. Calculate a time varying weight corresponding to each reference trace/reference sensor as the inverse of the square envelope found in the previous step.
4. Calculate the common reference time series for each point in time as a weighted average of the reference traces recorded and the corresponding weights found in the previous step.

The inventors have found that in step 2c, a Blackman time-window is advantageous, although other window functions may also be used.

Furthermore, the inventors have found that instrument noise frequencies within a convolution response bandwidth will be somewhat distorted when the resulting square envelope is applied as a weighting function (step 3 and 4). The convolution response bandwidth should therefore be kept well below the frequency range of interest for further data analysis.

In a specific experiment a Blackman time-window with nonzero duration of 3 sec was used.

The inventors have further found it to be advantageous to select the low frequency cut-off to be well above a bandwidth of the convolution response in order to minimize distortion problems. Furthermore, the inventors have found that the high frequency cut-off should preferably be chosen to correspond to a dominating bandwidth of the seismic source used.

In a specific experiment, a low frequency cut-off of 10 Hz and a high frequency cut-off of 100 Hz were used.

Figure 3:
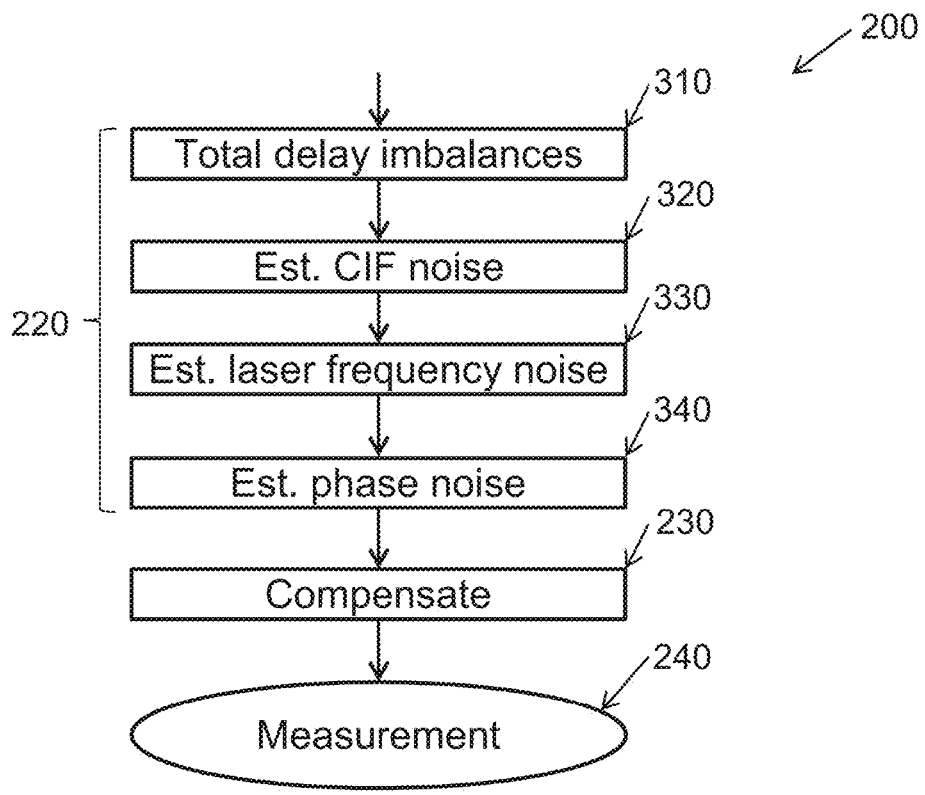
FIG. 3 is a flow-chart of an embodiment of the method according to the invention.
Figure 6:
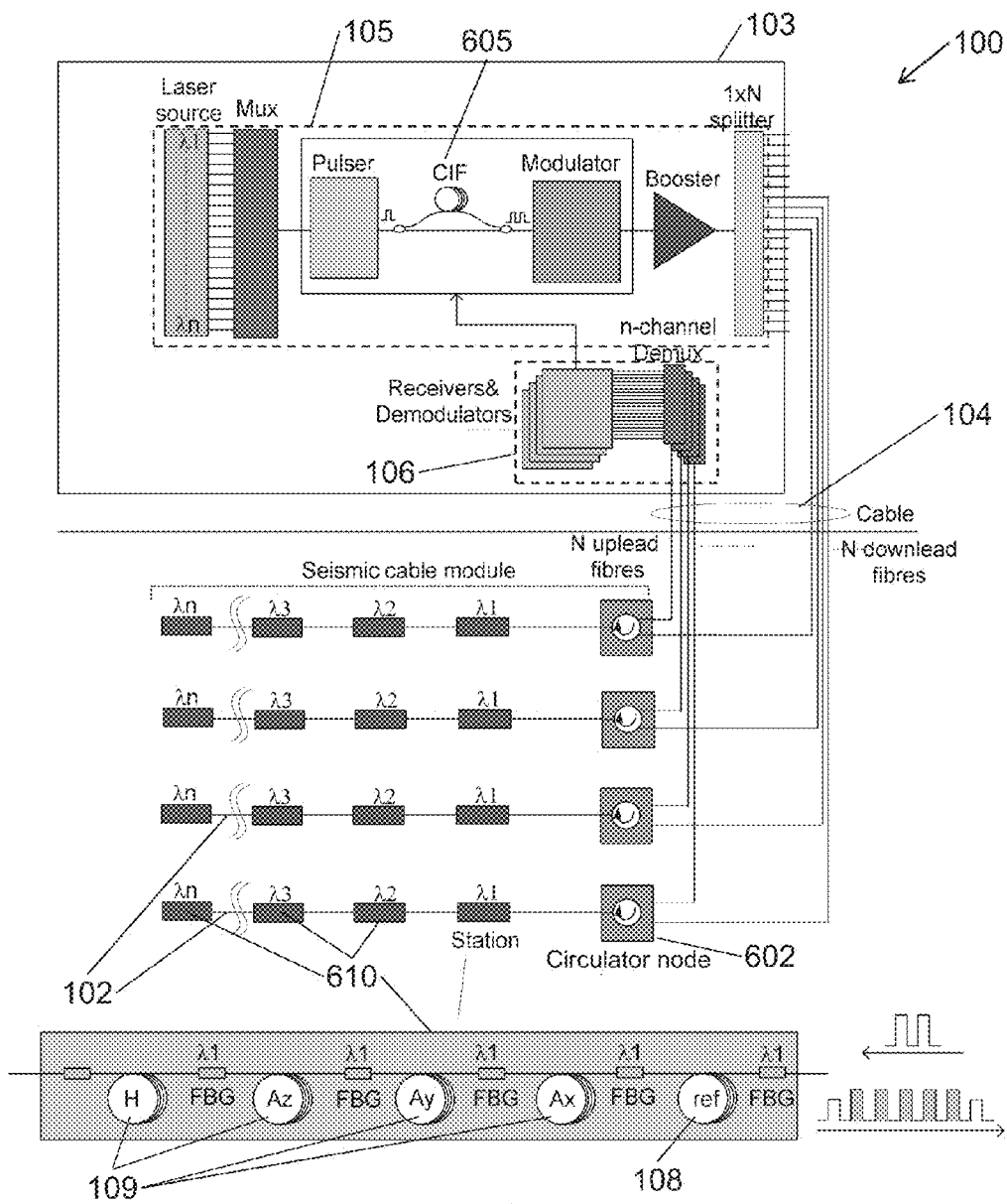
FIG. 6 is an embodiment of the distributed fibre-optic interferometric sensor system according to the invention.

FIG. 3 illustrates an embodiment of the method according to the invention. In this case, the method is adapted for compensating raw measurement time series from an interferometric sensor system comprising a compensating interferometer (CIF). One embodiment of such as sensor system is shown in FIG. 6, which will be discussed below. A CIF is not the same as a reference interferometer as described above and as used in the context of this document. Rather, a CIF is used to split one interrogating pulse into two pulses separated in time, which after travelling the two different paths (generally having different path lengths) of a sensor interferometer are recombined to create an interference pulse at the detector. The interference pulse (or a multiple of them) is demodulated to extract the interference phase. The use of CIFs is known in the art, e.g. from UK patent application GB 2 284 256. The CIF may also be placed at the receiver end if the sensor is interrogated with single pulses instead of double pulses. In this case the CIF will recombine pulses that have been split in the sensor interferometer.

This demodulated phase may be interpreted as the difference between phase delays of the sensor and the CIF. If the CIF phase is stable, variations in the demodulated phase will be a direct measure for variations in the sensor phase. Any fluctuation in the CIF phase will result in a noise contribution to the demodulated phase. This noise will be equal for all sensors that are interrogated through the same CIF. One objective of the described method is to identify these fluctuations and to subtract them from the demodulated phase signal.

If the interferometer delays of the sensor and the CIF are not equal, the demodulated phase will also be sensitive to optical source (laser) frequency fluctuations. The demodulated phase will contain a noise component that equals the laser frequency noise multiplied by $2\pi$ times a total delay imbalance, where the total delay imbalance is the difference in propagation delay between the two pulse components that constitute interfering pulse. The total delay imbalance equals the delay imbalance of the CIF minus the delay imbalance of the sensor interferometer. If the total delay imbalance is the same for all sensors they will all have the same noise contribution from laser frequency noise, and this noise will therefore be indistinguishable from CIF noise. In this case the inventive method 200 as described above in connection with FIG. 2 will identify the sum of the CIF-induced and the laser frequency-induced noise and subtract both from the demodulated signal 240.

If the total delay imbalance differs between sensors, for instance due to production tolerances, the version of the described method 200 as shown in FIG. 3 may be used to identify CIF-induced and laser frequency-induced noise independently, and to remove them from the sensor signals. Thus, the step of calculating the common reference time series 220 is divided in a number of substeps, as shown. To do that the absolute delay imbalance must be known for all sensors 310. They may, e.g. be measured once by applying a known frequency modulation amplitude to the laser and relating this amplitude to the resulting demodulated phase amplitude. The CIF noise may then be estimated 320 as a measurement of central tendency of the recorded reference sensor signals, in the form of measured phase delays of for each of the reference sensors. The laser frequency noise may then be estimated 330 from the reference sensors as a measurement of central tendency (of the raw measurement time series of the reference sensor minus the estimated noise) divided by ($2\pi$ times the total reference sensor imbalance). The frequency induced phase noise for each measurement sensor can then be estimated 340 by multiplying the estimated frequency noise by the known total imbalance for that measurement sensor times $2\pi$. Finally, the CIF noise and frequency induced phase noise contributions are subtracted 230 from the recorded raw measurement time series for the measurement series, to achieve the compensated measurement time series.

Figure 4:
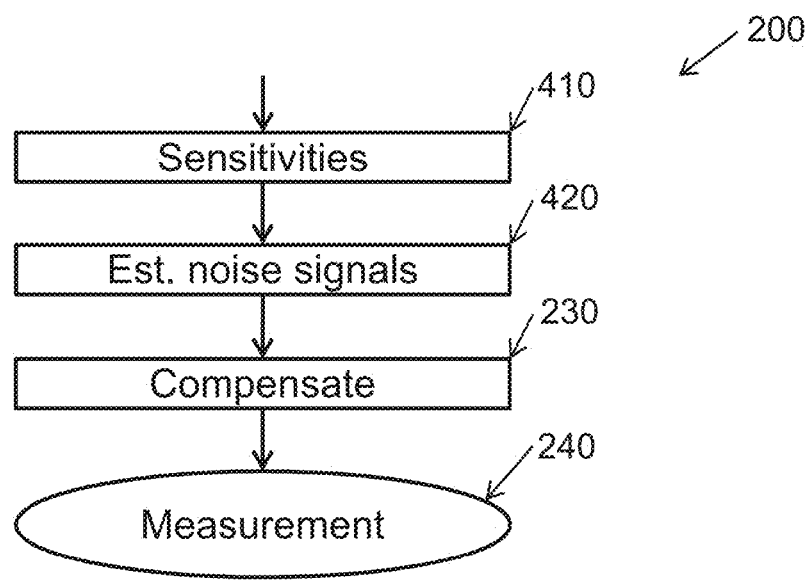
FIG. 4 is a flow-chart of an embodiment of the method according to the invention.
Figure 5:
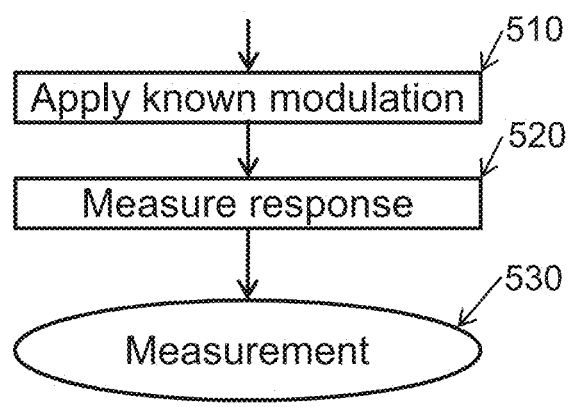
FIG. 5 is a flow-chart of parts of an embodiment of the method according to the invention.

FIG. 4 illustrates an embodiment of the method 200 according to the invention. This embodiment relates to the generic case where the multiple interferometric sensors are sensitive to one or more common noise sources, with generally different sensitivities of each sensor to each of the noise sources. First, the sensitivities towards each of the noise source are provided for each of the sensors 410. These sensitivities may, e.g., be provided by probing the sensor system as illustrated in FIG. 5, for instance as part of an initialization process. Then, the noise source signals as detected by each of the reference sensors are estimated 420 from the recorded raw measurement time series of the reference sensors and the provided sensitivities. This may, e.g. be done by finding a least squares solution to an over-determined set of linear equations. Subsequently, the raw measurement time series of each of the measurement sensors may be compensated 230 by subtracting the sum of all the estimated noise source signals, multiplied by the sensitivity of the measurement sensor to the respective noise sources.

Probing the sensitivities of the individual interferometric sensors is illustrated in FIG. 5. Here, a known modulation is applied to each of the noise sources 510, after which a response is measured for each of the sensors and each of the noise sources 520 to provide a measurement 530. For most noise sources, sensor sensitivities are substantially constant over time. Hence, probing for these noise sources is only required to be performed once, e.g. as part of a calibration procedure after installation. However, noise contributions arising from nonlinear effects in the optical fibres may change over time, thus requiring re-calibration in response to such changes. In one embodiment, a probe signal is launched into the distributed sensor system at intervals or continuously and the return signal is monitored for changes due to nonlinear effects. The probe signal may be selected to have a wavelength coinciding with one of the sensor wavelengths, i.e. within a sensor wavelength band, or may be selected to be just outside the sensor band.

FIG. 6 illustrates an embodiment of a distributed fibre-optic interferometric sensor system 100, which is adapted for use as an ocean bottom seismic sensor system. The interferometric sensors are arranged in sensor stations 610, here illustrated to comprise one hydrophone (H), and three accelerometers (Ax, Ay, Az), arranged to be sensitive for acceleration along the respective principal axis, these four sensors being measurement sensors 109. Furthermore, the sensor stations 610 are here illustrated to comprise a reference sensor (Ref) 108. The inventors, however, also foresee other embodiments of the sensor system 100, where reference sensors are located away from the measurement sensors 108. In order to facilitate a large number of sensor stations 610, as commonly required for ocean bottom seismic-sensor systems, sensors within a sensor station 610 are multiplexed by time division multiplexing (TDM) on one sensing fibre 102, while wavelength division multiplexing (WDM) is used along the same one sensing fibre to multiplex several sensor stations 610 along one seismic cable module. In the figure the different operating wavelengths $\lambda_i$, i=1 . . . n of the stations are indicated. The sensor fibre in each seismic cable module is connected to the downlead and uplead fibres 104 via an optical circulator in a circulator node 602. Several seismic cable modules can be joined in series to form long seismic cables with a large number of sensor stations, and several seismic cables can be installed in parallel over a large area at the ocean bottom. The downlead and upload fibres 104 in the lead-in cables are connected to the transmitter 105 and receiver part 106 of the interrogating instrument, respectively. The transmitter 105 comprises one laser per operating wavelength, a multiplexer, at least one pulser, CIF 605, and modulator, as well as a booster amplifier and splitter network to distribute the interrogating light among all downlead fibres. The receiver 106 part includes wavelength demultiplexer, as well as receivers and demodulators.

Figure 7:
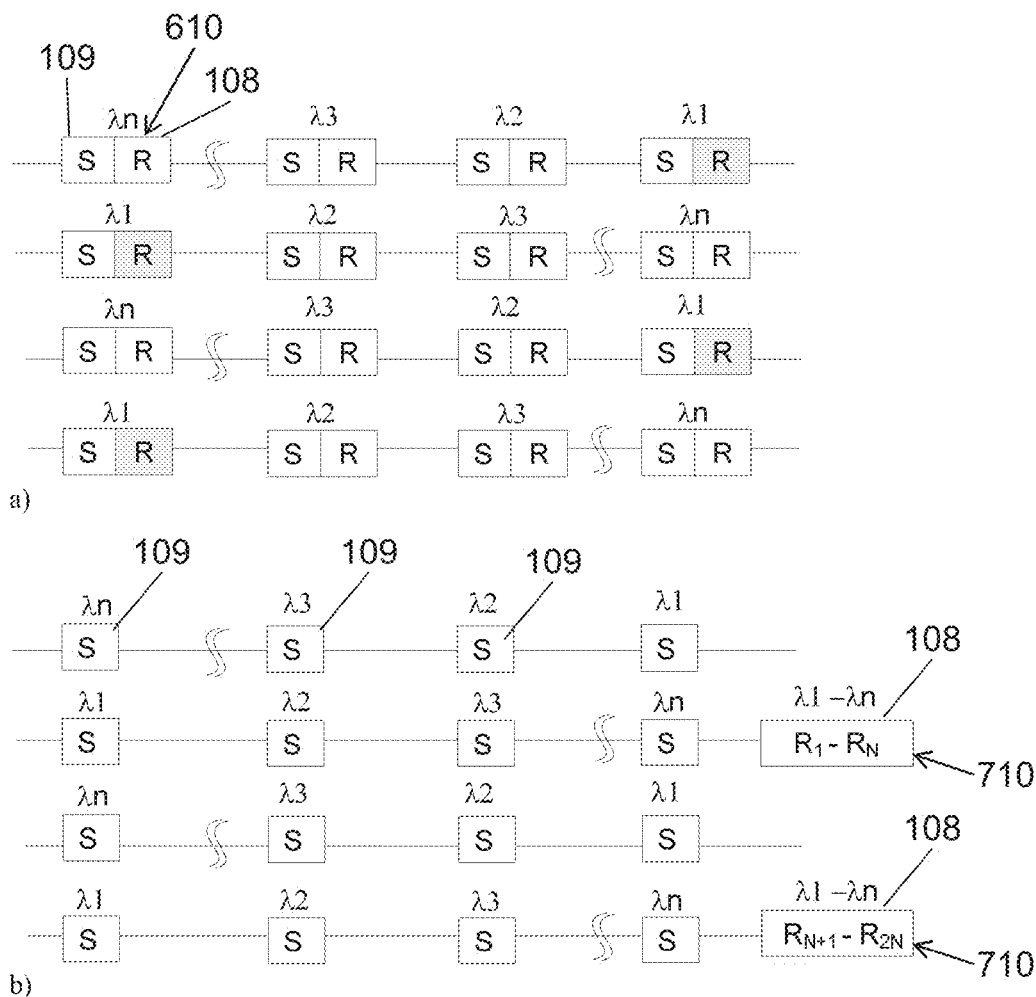
FIG. 7 illustrates sensor configurations of the distributed fibre-optic interferometric sensor system according to embodiments of the invention.

FIG. 7 illustrates different possible sensor topologies, with respect to the placement of the reference sensors (R) 108. In FIG. 7a, one or more measurement sensors (S) are co-located with a reference sensor, both operating at the same wavelength. Thus, the configuration of FIG. 7a corresponds to the configuration shown in FIG. 6 with regards to this aspect. In FIG. 7b, measurement sensors 109 in sensor stations 610 are arranged in a pattern, and reference sensors 108 for the different wavelengths $\lambda_1 \ldots \lambda_n$ are lumped together in one or more reference stations 710. In this way, the sensors stations 610 may be made more compact.

Figure 8:
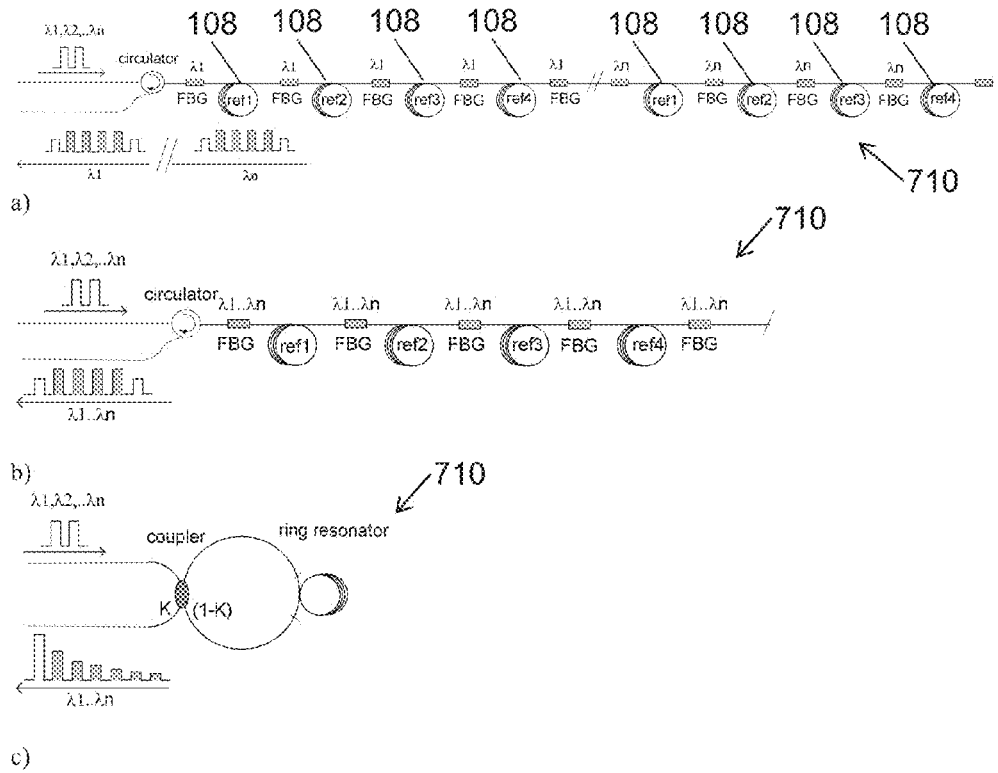
FIG. 8 illustrates different reference sensor configuration embodiments according to the distributed fibre-optic interferometric sensor system of the invention.

FIG. 8 shows different embodiments of reference stations 710, which may all function as references for multiple wavelengths $\lambda_1 \ldots \lambda_n$. FIG. 8a illustrates a reference station 710 comprising FBG-based Fabry-Perot interferometers as reference sensors 108 for each wavelength in succession. Here, the station is shown with four reference sensors (ref1-ref4) for each wavelength. The reference station 710 shown in FIG. 8b also comprises four reference sensors (ref1-ref4) acting for all wavelengths. However, the difference in this case, compared to FIG. 8a is that multi-wavelength FBGs are used. Therefore, each reference sensor interferometer may simultaneously function as reference for all wavelengths, by launching pulses at these wavelengths into the reference at the same time. Thus, a more compact reference station 710 may be achieved in this configuration. FIG. 8c illustrates a reference station based on a fibre-optic re-circulating ring resonator. Such a resonator will also function as a reference for multiple wavelengths, and light coupled into the ring will be coupled back out gradually from circulation to circulation. This is indicated in the schematic pulse train shown at the output.

Figure 9:
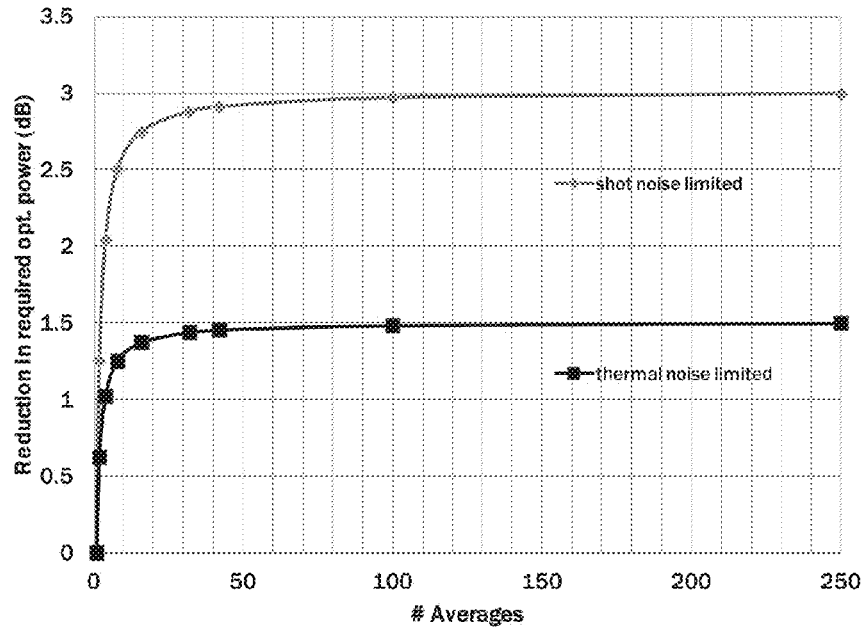
FIG. 9 illustrates a reduction in required optical power as a function of number of reference sensors used to calculate the common reference time series according to the inventive method.

FIG. 9 shows the calculated reduction in required optical power to be received in order to obtain the same demodulated noise as without averaging, as a function of the number of reference sensors used to calculate the measurement of central tendency. In this calculation, an arithmetic mean ("average") is used as the measurement of central tendency. Two curves are shown, for the case where the demodulated noise is dominated by shot noise, or where it is dominated by thermal noise. In general, subtraction of the reference signal from a raw measurement time series increases the noise power by a factor $1+1/N$, where N is the number of averages. Hence the maximum noise power reduction with large N compared to N=1 (no averaging) is a factor of 2 (3 dB). When the signal is shot noise limited, the demodulated noise (measured in $\mu$rad/rtHz) is proportional to $1/\sqrt{P}$, while when thermal noise limited, the noise is proportional to $1/P$, where P is the average optical power at the receiver. Thus, the maximum reduction in required optical power is 3 dB when shot noise limited and 1.5 dB when thermal noise limited.

Although the present invention has been described in connection with the specified embodiments wherein like reference numerals refer to similar or identical parts, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method of processing data from a distributed fibre-optic interferometric sensor system for measuring a measurand, the system comprising multiple interferometric sensors, the method comprising:
    interrogating two or more of the multiple interferometric sensors to record a raw measurement time series for each of the two or more of the multiple interferometric sensors;
    calculating a common reference time series as a measurement of central tendency of the raw measurement time series from two or more reference sensors selected from the multiple interferometric sensors; and
    compensating at least one raw measurement time series from a measurement sensor selected from the multiple interferometric sensors with the common reference time series to produce a compensated measurement time series, the measurement sensor being configured to be sensitive to the measurand;
    wherein one or more of the two or more reference sensors is configured to have a reduced sensitivity to the measurand compared to the sensitivity to the measurand of the measurement sensor.

2. The method of claim 1, wherein the two or more reference sensors span a spatial reference extent, wherein the spatial reference extent is larger than a characteristic coherence length of the measurand and noise fluctuations in sensor surroundings to which the two or more reference sensors are sensitive.

3. The method of claim 1, wherein the measurement of central tendency is an arithmetic mean.

4. The method of claim 1, wherein the measurement of central tendency is a weighted mean.

5. The method of claim 4, wherein a weight associated with the raw measurement series from a selected reference sensor is calculated to be inversely proportional to a root mean square amplitude of the raw measurement series from the selected reference sensor.

6. The method of claim 1, wherein the measurement of central tendency is a median.

7. The method of claim 1, wherein the measurement of central tendency is a truncated mean.

8. The method of claim 1, wherein the distributed fibre-optic interferometric sensor system is or comprises a seismic sensor system and the multiple interferometric sensors comprises at least one of a fibre-optic hydrophone or a fibre-optic accelerometer.

9. The method of claim 1, wherein the distributed fibre-optic interferometric sensor system comprises a compensating interferometer (CIF) configured to introduce a CIF delay between optical pulses propagating two paths of the CIF, wherein the multiple interferometric sensors are each configured to introduce a sensor delay such that a total delay imbalance for each of the multiple interferometric sensors is defined as the CIF delay minus the sensor delay of that interferometric sensor, the method comprising:
  providing values of the total delay imbalance for each of the multiple interferometric sensors;
  estimating a CIF noise as a measurement of central tendency of the raw measurement time series for the two or more reference sensors;
  estimating a laser frequency noise for at least one reference sensor based on a measurement of central tendency divided by a total sensor imbalance value, the measurement of the central tendency being a measurement of central tendency of the raw measurement time series from each of the at least one reference sensor minus the estimated CIF noise, the total sensor imbalance value being the total sensor imbalance of the same of the at least one reference sensor times 2 π;
  for each measurement sensor, estimating a laser frequency induced phase noise as a product of the laser frequency noise and the total delay imbalance times 2 π; and
  subtracting the CIF noise and the laser frequency induced phase noise from the raw measurement time series of the measurement sensor to produce the compensated measurement time series.

10. The method of claim 1, wherein the multiple interferometric sensors are sensitive to one or more common noise sources and each of the multiple interferometric sensors has a sensitivity to a common noise source signal of a common noise source, the method comprising:
  for each of the common noise sources, providing values of the sensitivity of each of the multiple interferometric sensors to the common noise source;
  estimating the noise source signals from the raw measurement time series of the two or more reference sensors and the provided sensitivities of each reference sensor to each noise source signal; and
  for each measurement sensor, calculating the compensated measurement time series by subtracting the sum of all estimated noise source signals multiplied by the sensitivity of the measurement sensor to the respective noise sources.

11. The method of claim 10, wherein estimating the noise source signals comprises finding a least squares solution to an over-determined set of linear equations.

12. The method of claim 10, wherein the distributed fibre-optic interferometric sensor system comprises a compensating interferometer (CIF) configured to introduce a CIF delay between optical pulses propagating two paths of the CIF, wherein one of the one or more noise sources comprises CIF delay fluctuations, the method comprising estimating the noise source signal related to CIF delay fluctuations based on a prerequisite that the sensor sensitivities to CIF delay fluctuations are substantially equal for all of the multiple interferometric sensors.

13. The method of claim 12, wherein the multiple interferometric sensors each have a sensor delay, such that a total delay imbalance for each of the multiple interferometric sensors is defined as the CIF delay minus the sensor delay, and one noise source signal comprises laser frequency fluctuations, the method comprising estimating the noise source signal relating to laser frequency fluctuations based on a prerequisite that the sensitivity of a sensor to laser frequency fluctuations is proportional to the total delay imbalance of the sensor.

14. The method of claim 10, wherein one noise source signal comprises optical source intensity fluctuations, the method comprising estimating the noise source signal relating to source signal fluctuations based on a prerequisite that the sensitivity of a sensor to source intensity fluctuations is caused by nonlinear intensity to phase conversion in transmission fibres.

15. The method of claim 10, wherein the provided values of the sensitivity of each of the multiple interferometric sensors to a noise source is measured through probing, by applying a known modulation of the noise source and measuring a modulation response at a sensor signal.

16. A distributed fibre-optic interferometric sensor system comprising:
  a fibre optic interferometric sensor array comprising at least a first sensor group of multiple optic interferometric transducers, wherein the multiple optic interferometric transducers are configured for changing an optical property in response to a change of a measurand; and
  an interrogation system comprising:
    an interrogation light transmitter and a detector; and
    a signal processor configured to:
      interrogate two or more of the multiple optic interferometric transducers to record a raw measurement time series for each of the two or more of the multiple optic interferometric transducers;
      calculate a common reference time series as a measure of central tendency of the raw measurement time series from two or more reference transducers selected from the multiple optic interferometric transducers; and
      compensate at least one raw measurement time series from a measurement transducer selected from the multiple optic interferometric transducers with the common reference time series to produce a compensated measurement time series, wherein the measurement transducer is configured to be sensitive to the measurand;
    wherein one or more of the two or more reference transducers is configured to have a reduced sensitivity to the measurand compared to the sensitivity to the measurand of the measurement transducer.

* * * * *